United States Patent [19]

Kitagawa

[11] 4,242,418
[45] Dec. 30, 1980

[54] LAMINATE

[75] Inventor: Keishi Kitagawa, Fujimiya, Japan

[73] Assignee: Fuji Photo Film Co., Ltd., Minami-ashigara, Japan

[21] Appl. No.: 23,919

[22] Filed: Mar. 26, 1979

Related U.S. Application Data

[63] Continuation of Ser. No. 766,823, Feb. 8, 1977, abandoned.

[30] Foreign Application Priority Data

Feb. 10, 1976 [JP] Japan .................................. 51/13796

[51] Int. Cl.$^3$ ........................ B32B 23/08; B32B 27/08
[52] U.S. Cl. ..................................... 428/507; 428/511; 428/512; 428/513; 428/516; 428/517
[58] Field of Search ............... 428/511, 512, 513, 514, 428/516, 517, 507

[56] References Cited

U.S. PATENT DOCUMENTS

| | | | |
|---|---|---|---|
| 3,161,560 | 12/1964 | Paquin et al. | 428/513 |
| 3,719,628 | 3/1973 | Bergomi, Jr. et al. | 428/513 |

FOREIGN PATENT DOCUMENTS 6413512  5/1965  Netherlands ............................ 428/512

Primary Examiner—Thomas J. Herbert, Jr.
Attorney, Agent, or Firm—Sughrue, Rothwell, Mion, Zinn and Macpeak

[57] ABSTRACT

A polyolefin-paper laminate comprising (a) a base paper, (b) a copolymer of (1) at least one diene monomer and (2) at least one monovinyl substituted aromatic compound incorporated into or coated on the base paper, and (c) an extrusion coated polyolefin layer thereon. The base paper (a) impregnated with or coated with the copolymer (b) can be optionally subjected to a corona discharge treatment prior to extrusion coating of the polyolefin layer (c).

13 Claims, No Drawings

LAMINATE

This is a continuation of application Ser. No. 766,823, filed Feb. 8, 1977, now abandoned.

BACKGROUND OF THE INVENTION

1. Field of the Invention

The present invention relates to a laminate, and more particularly, to a polyolefin-coated paper using a base paper having incorporated therein or coated thereon a specific copolymer. The base paper after incorporation of or coating of the copolymer and prior to application of the polyolefin may be subjected to a corona discharge treatment.

2. Description of the Prior Art

Proposals have been heretofore made to coat the surface of a paper with polyolefins such as polyethylene, polypropylene or the like for use in various fields, e.g., as milk cartons, wallpapers, food wrapping papers, poster papers, printing papers, garbage bags, etc., to render the paper hydrophobic.

One conventional method of coating a paper with a polyolefin is the so-called dry lamination which comprises uniting the paper and a polyolefin film with an adhesive. Another method which is more efficient is an extrusion coating method which comprises extruding a polyolefin melt down onto a moving paper film through a T-die of an extruder, and, after adhering the polyolefin to the paper film, followed by uniting both under pressure while cooling the assembly at the same time.

However, polyolefins are non-polar high molecular weight materials and as a result good adhesion to paper is not necessarily achieved. Furthermore, from an economical viewpoint, a reduction in the amount of polyolefin coated and an increase in coating speed have been extensively required. From a quality consideration, a reduction in the extrusion temperature employed has also been required still more. Therefore, depending upon the material or the process of production thereof the tendency is to obtain a paper with insufficient adhesion between the paper and the polyolefin layer. It is recognized in the art that various problems in practical use are encountered with a coated paper which has insufficient adhesion.

That is, when a coated paper having insufficient adhesion between the paper and the polyolefin layer is cut and finish-worked, stretched portions of polyolefin layer which are beard-like or tufty tend to occur at the cut surface thereof, which results in a bad appearance at the cut section. When such occurs to an extreme, the polyolefin is not completely cut off so that two or more sheets still remain connected. Further, polyolefin tends to be peeled off from paper at the cut areas due to friction or the like.

An example of the application of a polyolefin coated paper to special fields includes the so-called water proof photographic printing paper. A water proof photographic printing paper is generally obtained by coating a light-sensitive photographic emulsion layer on a support comprising paper, both surfaces of which has been coated with polyolefins, for the purpose of enhancing the efficiency of the development processing by reducing the development processing period of time for the photographic printing paper.

In this case, if the adhesion between the polyolefin and the paper is insufficient, a peeling-off of the polyolefin from the paper occurs at the edge portions thereof, particularly when such is wet during the development processing, and a development processing solution is absorbed in the paper at the peeled portions so that the rapid processing desired can not be accomplished, in addition to the marked decrease in commercial value due to the bad appearance resulting from the inferior cut ends upon cutting and finish-working as mentioned above. At worst, the polyolefin layer may completely be peeled from the paper. Therefore, it is extremely essential in a polyolefin coated paper that sufficient adhesion between the paper and polyolefin be obtained.

The simplest method for providing good adhesion between a paper and a polyolefin comprises increasing the polyolefin resin temperature to a high temperature of about 320° C. or higher upon extrusion coating. However, this temperature is a temperature which is very close to the temperature at which the polyolefin is decomposed, and a part of the polyolefin may have already been decomposed. The decomposed polyolefin comes into contact with air on passing from the extruder through a T-die before being coated on paper, is oxidized and discolors, which results in a deterioration of the color hue of the coated paper or a bad smell. These are fatal defects particularly when such is contemplated for use as a food wrapping. In addition, when such is to be used as a photographic support, thermal decomposition products adversely affect photographic emulsions causing fogging, which is also fatal for this use. Further, the so-called fish eyes are undesirably formed during extrusion coating over a long period of time so that the working efficiency is decreased and a decrease in the commercial value of the coated paper and an inferior appearance result.

It is also possible to improve the adhesion between a paper and a polyolefin by increasing the thickness of the polyolefin coating. However, this increases the cost and further changes the curl balance which causes difficulty in handling.

In addition, activation treatments such as subjecting a paper surface or the like to a corona discharge treatment as described in U.S. Pat. No. 3,411,908, British Pat. No. 1,005,631 and Japanese Patent Publication No. 22834/73 are also conventional. However, in general, a marked improvement in adhesion strength is not obtained.

For the purpose of providing sufficient adhesion strength, a method which comprises previously coating a material having good adhesion both to a paper and to a polyolefin onto a paper surface prior to coating the polyolefin on the paper (a so-called primer treatment) and then performing an extrusion coating has been proposed. Examples of materials which are employed for such a primer treatment include polyethylene imines, low molecular weight polyethylene emulsions, ethylene-sodium acrylate copolymers, vinyl acetate resins, polyacrylic acid esters, polyvinylidene chloride, polyacrylic acids and the like. However, these materials have the disadvantages that adhesion is sufficient and in particular, when the resin temperature is decreased upon extrusion coating, the adhesion suddenly decreases.

As a result of extensive investigations to eliminate the above disadvantages, a method of improving adhesion between a paper and a polyolefin, in particular, upon extrusion coating at low temperatures, has now been found.

SUMMARY OF THE INVENTION

That is, the present invention provides a polyolefin-paper laminate comprising a base paper, a copolymer of (1) at least one diene monomer and (2) at least one monovinyl-substituted aromatic compound incorporated into or coated on the base paper and a polyolefin layer extrusion coated thereon.

The present invention further provides a polyolefin-paper laminate comprising a base paper, and a copolymer of (1) at least two diene monomer and (2) at least one monovinyl-substituted aromatic compound incorporated into or coated on the base paper subjected to a corona discharge treatment and having a polyolefin layer extruded thereon.

DETAILED DESCRIPTION OF THE INVENTION

Firstly, the copolymer employed in the present invention is explained below in detail.

The term diene (sometimes referred to herein as a diene monomer), which is a first component of the copolymer, refers to a compound having two ethylenically unsaturated bonds in the molecule thereof. The diene monomer may either be an aliphatic unsaturated hydrocarbon represented by the formula (I):

$$C_nH_{2n-2} \tag{I}$$

wherein n is an integer of from 4 to 20, or be a cyclic unsaturated compound represented by the formula (II):

$$C_nH_{2n-4} \tag{II}$$

wherein n is an integer of from 5 to 20. More specifically, suitable diene monomers include conjugated dienes which are exemplified by butadiene, isoprene and chloroprene, and non-conjugated dienes which are exemplified by 1,4-pentadiene, 1,4-hexadiene, 3-vinyl-1,5-hexadiene, 1-allyl-1-cyclopentene, 1-allyl-1-cyclohexene, 1,5-hexadiene, 3-methyl-1,5-hexadiene, 3,4-dimethyl-1,5-hexadiene, 3,4-diethyl-1,5-hexadiene, 1,2-divinylcyclobutane, 4-vinyl-1-cyclohexene, 1,6-heptadiene, 3,5-diethyl-1,6-heptadiene, 4-cyclohexyl-1,6-heptadiene, 3-(4-pentenyl)-1-cyclopentene, 1,7-octadiene, 1,8-nonadiene, 1,9-decadiene, 1-cis-9-cis-12-octadecatriene, 1,10-undecadiene, 1,11-dodecadiene, 1,12-tridecadiene, 1,13-tetradecadiene, 1,14-pentadecadiene, 1,15-hexadecadiene, 1,17-octadecadiene, 1,21-docosadiene, etc.

Further, examples of suitable diene monomers include those diene monomers as described above in various isomeric forms which occur depending upon the polymerization method.

Particularly preferred diene monomers are butadiene and isoprene. Of these, butadiene is most advantageously employed since butadiene is easily and inexpensively obtained from the gaseous products of the thermal decomposition of petroleum fractions, intermediates or wastes of other petroleum chemical products.

A preferred range for the diene content is about 5 wt% to about 95 wt%. If the content of the diene component such as butadiene is overly small, the copolymer merely provides poor adhesion. A particularly preferred range for the diene content is from 20 wt% to 80 wt%.

The monovinyl-substituted aromatic compound, which is a second component of the copolymer, forms a hard segment in the copolymer.

Typical examples of the monovinyl-substituted aromatic compounds which can be used are styrenes such as styrene, α-methylstyrene, methylstyrene, dimethylstyrene, trimethylstyrene, α-ethylstyrene, diethylstyrene, isopropylstyrene, butylstyrene, hexylstyrene, cyclohexylstyrene, decylstyrene, benzylstyrene, chloromethylstyrene, ethoxymethylstyrene, methoxystyrene, dimethoxystyrene, chlorostyrene, dichlorostyrene, trichlorostyrene, tetrachlorostyrene, pentachlorostyrene, bromostyrene, dibromostyrene, vinylbenzoic acid, vinylbenzoic acid methyl ester, etc.

Of these styrenes, styrene and methylstyrene are particularly preferred. The monovinyl-substituted aromatic compound component is employed in order to improve the physical properties of the copolymer. A preferred range of the amount of the monovinyl-substituted aromatic compound in the copolymer is from about 5 wt% to about 95 wt%. The hardness of the coated layer of the copolymer is determined depending upon the content of the monovinyl-substituted aromatic compound, for example, in using styrene, as the styrene content increases, a second order transmission temperature (glass transition temperature) increases so that the layer strength increases. However, if the styrene component is overly large, the layer becomes brittle and adhesion is decreased. Therefore, a more preferred range of the amount of the monovinyl-substitured aromatic compound to be used in the copolymer is from 20 wt% to 80 wt%.

By further introducing a component having a carboxyl group as a substituent as a third component and an additional compound as later described as a fourth component into the copolymer used in the present invention, the adhesion of the polyolefin layer to the paper can further be remarkably enhanced. In particular, the component having a carboxyl group greatly contributes to improved adhesion.

The component having a carboxyl group is believed to increase adhesion to cellulose and can be represented by the formula (III):

$$R_1-CH=C-R_2 \atop | \atop COOH \tag{III}$$

wherein $R_1$ and $R_2$, which may be the same or different, each is selected from the group consisting of a hydrogen atom, an alkyl group (e.g., having 1 to 12 carbon atoms), an aryl group (e.g., having 6 to 12 carbon atoms), in which the alkyl group may further is substituted to form $-CH_2COOH$, $-CH_2CH=CHCHO$, $-CH_2-COOR_3$ (wherein $R_3$ is a group having 1 to 6 carbon atoms). Specific examples of carboxyl group-containing components are acrylic acid, methacrylic acid, itaconic acid, crotonic acid, sorbic acid, cinnamic acid, citraconic acid, methaconic acid, maleic acid, fumaric acid, ethacrylic acid, maleic anhydride, itaconic anhydride, etc.

Of these carboxyl group-containing components, acrylic acid, methacrylic acid, itaconic acid and maleic acid are particularly preferred. It is preferred that the carboxyl group-containing component be used in the copolymer in an amount of 0 to about 20 wt%. A more preferred range in the copolymer is 0.1 to 10 wt%. When the amount of the carboxyl group-containing component is less than 0.1 wt%, the improvement of adhesion is not as great as is the case where a carboxyl group-containing component is absent, and if it exceeds 10 wt%, maximum adhesion is obtained and no further increase in adhesion is achieved. It is further difficult to synthesize copolymers containing more than 20 wt% of the carboxyl group-containing component. In addition, even if more than 20 wt% of the carboxyl group-containing component is present in the copolymer, the improvement in adhesion is not as marked as compared to the case using a copolymer containing less than 20 wt% of the third component.

Furthermore, a polymeric material, as a fourth component, containing an ester bond, —CHO, —CONH$_2$, —CONHCH$_2$OR$_4$,

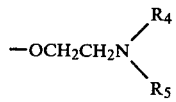

(wherein R$_4$ and R$_5$ each is a hydrogen atom or an alkyl group, e.g, having 1 to 12 carbon atoms, such as a methyl, ethyl, propyl, butyl, etc., group),

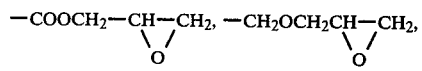

or the like may be present in the copolymer. Preferred examples of the fourth component are glycidyl methacrylate, acrolein, methoxymethylacrylamide, dimethylaminoethyl methacrylate and acrylamide. A preferred content of the fourth component is 0 to about 10 wt%. By incorporation of the fourth component into the copolymer, adhesion between the polyolefin and the paper can be further improved.

A representative example of the copolymer which can be employed in accordance with the present invention is a copolymer comprising at least two components of about 5 to about 95wt% (preferably 20 to 80 wt%) of a monovinyl-substituted aromatic compound such as styrene, and about 5 to about 95 wt% (preferably, 20 to 80 wt%) of a diene monomer such as butadiene. Where a monomer having a carboxyl group, such as acrylic acid, is incorporated in an amount of 0.01 to 20 wt% (preferably, 0.1 to 10 wt%), the primer effect is further improved, as is described hereinabove. Other examples of copolymers which can be used in accordance with the present invention include a styrene-butadiene copolymer, an α-methylbutadiene copolymer, a styrene-isoprene copolymer, etc., a styrene-butadiene-acrylic acid copolymer, a styrene-butadieneitaconic acid copolymer, an α-methylstyrene-isoprene-acrylic acid copolymer, etc., a styrene-butadiene-acrylic acid-acrylamide copolymer, a styrene-butadiene-itaconic acid-glycidyl methacrylate copolymer, an α-methylstyrene-isoprenemaleic acid-acrolein copolymer, etc.

The term "primer effect" as used herein refers to the effect of improving adhesion between the paper and the polyolefin layer achieved by the provision of materials such as the copolymer employed in the present invention, and usually the improvement of adhesion between the paper and the polyolefin layer is achieved by coating polyacrylic acid, polyvinylidene chloride, polyvinyl chloride, etc., on the paper and laminating the polyolefin thereon. The treatment with such substances is sometimes referred to herein as a "primer treatment".

The above-described copolymer is usually obtained as a latex. The copolymer can be used as a solution by dissolving the copolymer in appropriate solvents, such as toluene, benzene, xylene, chloroform, carbon tetrachloride, trichlene, perchlene, methyl ethyl ketone, diethyl ether, tetrahydrofuran, trisdimethylphosphamide ((CH$_3$N)$_3$PO), etc., in an amount of about 0.5 to about 50 wt %, preferably 1 to 10 wt %. It is, however, advantageous to use as an aqueous latex from considerations of workability and safety, in general.

Where the copolymer composition is employed in use, various emulsion latexes, such as a polyethylene latex, an ethylene-vinyl acetate copolymer latex, etc., and water soluble high molecular weight materials, such as polyvinyl alcohol, gelatin, polyacrylic acid, carboxymethyl cellulose, polyacrylamide, etc., can be incorporated therein in order to prevent excessive permeation of the copolymer composition into the base paper and to control viscosity improving the coating capability and further to increase adhesion. For the purpose of enhancing adhesion between the paper and the polyolefin, it is desired that these primers be present on the surface of paper. Therefore, while it is possible to incorporate the copolymer described above during the production of the paper, it is preferred for the copolymer to be applied to the surface of the paper at a final step in producing the paper or immediately before the extrusion coating of the polyolefin layer on the paper. More specifically, a method of surface sizing with the primer using a size press during paper making, a method of coating the primer solution on the surface of the paper immediately before polyolefin extrusion coating using roll coating, bar coating, gravure coating, air knife coating, dip coating, etc., or a method of spray coating the primer solution through a nozzle onto the paper are preferred.

A preferred coating amount of the copolymer is about 0.01 to about 10 g/m$^2$ on a dry basis. Sufficient adhesion is not obtained with a coating amount less than about 0.01 g/m$^2$, and a coating amount higher than about 10 g/m$^2$ increases the load in drying after coating so that various difficulties are encountered during production. In addition, if the coating amount is overly increased, no additional adhesion strength is achieved but the cost is increased. Thus, a more preferred coating amount of the copolymer is 0.1 to 5 g/m$^2$.

When the copolymer is incorporated into the base paper, the amount of copolymer to be incorporated depends upon the efficiency of the paper making conditions, but preferably an amount of copolymer of about 0.5 to about 50 wt % to the pulp is employed. A particularly preferred range is 0.5 to 10 wt % to the pulp.

As described hereinabove, the copolymer can be applied to the base paper by incorporating the copolymer into the paper during paper making, by surface sizing the paper with the copolymer, by coating the copolymer on the surface of the paper, and the like.

In a further embodiment of the invention, the base paper with the copolymer coated thereon or incorporated therein can be subjected additionally to a corona discharge treatment, prior to polyolefin extrusion coating, to even further enhance adhesion. This corona discharge treatment can be performed under the conditions as described in and using appropriate equipment as described in Japanese Patent Publications Nos. 9411/56, 10614/57, 10615/57, 9275/60, 16440/67, and 19300/75, U.S. Pat. Nos. 2,715,075, 2,846,727, 2,864,755, 2,864,756, 2,910,723, 3,018,189, 3,072,483, 3,076,720, 3,153,683, 3,255,034, 3,375,126, 3,411,908, 3,431,135, 3,520,242, 3,549,406, 3,590,107 and 3,888,753, British Pat. Nos. 1,005,631 and 1,394,261, etc.

More specifically, copolymer coated paper substrate can be subjected to a corona discharge of from about 0.1 to about 3.5 rfa (radio frequency amperes). For illustration, a 60 cycle Lepel high frequency generator operating at 6 Kva at 440 volts with an output of 2.5 rfa can be used with several metal electrodes close to the paper at a point where the paper is passing over a metal roll coated with a dielectric material.

A preferred embodiment comprises coating both surfaces of the base paper with the copolymer and then covering the coated paper with a polyolefin layer. A further preferred embodiment comprises coating both surfaces of paper with the copolymer, subjecting the coated paper to a corona discharge treatment as described above and then covering the thus treated paper with a polyolefin layer. The thus formed laminate is suitable for use as a support for a photographic printing paper because of the following advantages:

(1) the temperature used in extrusion coating of the polyolefin can be reduced;

(2) adverse influences on the photographic emulsion layers coated on a polyolefin coated paper due to the presence of thermal decomposition products of the polyolefin produced with prior art high-temperature polyolefin coating methods can be eliminated;

(3) commercial value as a printing paper is markedly enhanced since fish eyes are not produced, and the appearance and smoothness are not damaged;

(4) because of the excellent adhesion between the paper and the polyolefin layer, the chance of peeling of the polyolefin layer from the paper during developing processing steps is minimized;

(5) by coating or incorporating the copolymer on or in the paper, disadvantages are eliminated in that the sizing property of the paper is increased, development processing solutions do not permeate into cut sections of the printing paper; and the periphery of the printing paper is not contaminated with the oxidation products of the residues of the processing solutions even after development processing and subsequent water washing; and (6) the copolymer per se does not adversely affect the photographic emulsion layers.

Therefore, it is particularly advantageous in the preparation of a photographic printing paper composed of a polyolefin coated paper to employ the copolymer as a primer for the base paper employed and further to subject the primer treated base paper to a corona discharge treatment.

Photographic light-sensitive materials and processings are well known in the art and are described in, for example, Kikuchi, *Shashin Kagaku* (*Photographic Chemistry*), published by Kyoritsu Publishing Co., Ltd., Tokyo (1973). Examples include silver halide emulsions for black-and-white photography, silver halide emulsions for color photography, photographic emulsions for the diffusion transfer process, emulsions for the diazo process, photographic emulsions for X-ray photography, etc. These emulsions are explained in detail in, for example, C. E. K. Mees, *The Theory of the Photographic Process*, 3rd Ed., and such can be coated on a photographic printing paper as described above.

The term "polyolefin" as used herein refers to a homopolymer of an α-olefin having 2 to 8 carbon atoms, such as ethylene, propylene, butylene, isobutylene, isoprene, amylene and the like; a copolymer comprising two or more α-olefins, such as ethylene, propylene, etc., e.g., an ethylene-propylene copolymer, an ethylene-butylene copolymer, etc.; a copolymer mainly composed of an α-olefin (about 50 wt% or more) and further containing other monomers copolymerizable with an α-olefin, such as vinyl acetate, acrylic acid, ethyl acrylate, etc., e.g., an ethylene-vinyl acetate copolymer, an ethylene-acrylic acid copolymer, an ethylene-ethyl acrylate copolymer, etc.; and a mixture thereof. The polyolefin has a melt index of about 0.5 to about 50. The polyolefin may further contain white pigments, such as titanium oxide, zinc oxide, talc, calcium carbonate, alumina, etc., in an amount of about 0.1 to about 30 wt %, and/or glass fibers, fiber-like fillers, such as asbestos, whiskers, etc., in an amount of about 0.1 to about 30 wt %, colored pigments, such as carbon black, chrome yellow, titanium yellow, Bengal yellow, etc., in an amount of about 0.01 to about 10 wt %. The polyolefin layer is coated on the paper having the copolymer thereon or therein by extrusion coating at about 200 to about 330° C.

Further, conventional additives which are ordinarily used in polyolefin layers may be added to the polyolefin within a range which does not adversely affect the present invention, generally up to about 5 wt %. Examples of these additives are stabilizers, anti-oxidants, anti-static agents, plasticizers, dispersing agents, smoothening agents and the like.

In the present invention, there is no specific limitation to thickness of the polyolefin layer, but in general, a thickness of about 5 to about 100 microns is preferred.

The term "paper" is not limited only to paper and is used herein to refer to a paper comprising natural pulp, a paper comprising a synthetic pulp, such as polyethylene or polypropylene, a paper obtained by paper making using a mixture of natural pulp and synthetic pulp, etc.

The present invention will be explained in more detail with reference to the examples hereinbelow, but the present invention is not to be construed as being limited to these examples. Unless otherwise indicated herein, all parts, percents, ratios and the like are by weight. Further, in the examples, the adhesion strength was evaluated as follows.

EVALUATION OF ADHESION STRENGTH

The test method of evaluating the adhesion strength between paper and polyolefin was in accordance with the method set forth in JIS K 6854-1973. That is, the polyolefin coated paper was cut into a 25 mm width to produce a test piece. The peeling-off adhesion strength (hereinafter simply referred to as peeling strength) was measured by peeling off the polyolefin layer from the test piece in a 180° direction (turn-back peeling off) at a peeling-off rate of 50 mm/min.

For example, if the peeling strength was greater than 90 g/25 mm, the adhesion between the paper and the polyolefin layer was good as a support for a printing paper and, therefore, no problems as described above were encountered during development processing steps and during cutting and finish-working. With a peeling strength of from 90 to 50 g/25 mm, problems were sometimes encountered. If the peeling strength is less than 50 g/25 mm, the adhesion is not sufficient for practical use.

EXAMPLE 1

Onto the surface of a fine quality paper of a basis weight of 150 g/m² were coated (1) a styrene-butadiene copolymer (monomer weight ratio=65:35) latex, (2) an acrylic acid-styrene-butadiene copolymer (monomer weight ratio=1:60:39) latex, (3) a polyacrylic acid emulsion, (4) a polyvinylidene chloride latex, and (5) a polyvinyl chloride latex, respectively, in an amount of 0.5 g/m² on a dry basis. Each of the coated papers was heat dried at 45° C. for 1 minute with warm air to prepare samples.

Further, samples in which the thus primer treated surface of each of the samples was subjected to a corona discharge treatment using a corona discharge treatment apparatus (Model HF-101, made by Kasuga Denki Co., Ltd.; output frequency: 110 KHz; 300 watts; treatment rate: 10 m/min.; length of discharge electrodes: 30 cm; spacing between discharge surfaces: 1 mm) were also prepared.

For comparison, a sample on which (6) no primer treatment was made but whose surface had been similarly subjected to a corona discharge treatment was also prepared.

Polyethylene containing 7 wt% of titanium oxide and having a density of 0.916 g/cm³ was extrusion coated at 290° C. onto the primer treated surface and onto both the primer treated and corona discharge treated surface, of the above-described paper samples, respectively, in a dry thickness of 25 microns. Thus, laminate samples were obtained.

The peeling strength of the thus formed laminate samples was measured as described above, the results of which are shown in Table 1 below.

TABLE 1

| | Peeling Strength (g/25 mm) | |
|---|---|---|
| Primer Treatment | Corona Discharge Treatment | No Corona Discharge Treatment |
| (1) Styrene-Butadiene* Copolymer | 183 | 91 |
| (2) Acrylic Acid-Styrene-Butadiene Copolymer* | 205 | 133 |
| (3) Polyacrylic Acid | 62 | 22 |
| (4) Polyvinylidene Chloride | 81 | 32 |
| (5) Polyvinyl Chloride | 64 | 21 |
| (6) None | 70 | 25 |

*Invention

From the results above, it can be seen that the laminates to which primer treatment with the styrene-butadiene copolymer or the acrylic acid-styrene-butadiene copolymer in accordance with the present invention was applied exhibited superior peeling strength. It can also be seen that when the primer treatment of the present invention was followed by a corona discharge treatment, the peeling strength was remarkably improved.

EXAMPLE 2

In making a photographic paper of a basis weight of 180 g/m², surface sizing of the papers with the primers described in Example 1 was performed.

The coated amount was 0.25 g/m² on a dry basis in all cases.

After both sides of the thus surface sized paper had been subjected to a corona discharge treatment in a manner similar to Example 1, polyethylene having a density of 0.926 g/cm³ was extrusion coated at 280° C. on both sides of the paper in a dry thickness of 30 microns, each. Thus, a water proof support for a photographic printing paper was prepared. The peeling strength of the thus obtained supports was measured.

For comparison, sample supports were prepared in a manner similar to the above except that (a) no surface sizing treatment with the primers nor corona discharge treatment subsequent thereto were performed on the base paper, and (b) no surface sizing treatment was conducted but a corona discharge treatment was applied to the base paper. The peeling strength of the sample supports was measured in a similar manner.

The results obtained are shown in Table 2 below.

TABLE 2

| | Peeling Strength (g/25 mm) | |
|---|---|---|
| Surface Sizing Agent | Corona Discharge Treatment | No Corona Discharge Treatment |
| (1) Styrene-Butadiene Copolymer* | 195 | 95 |
| (2) Acrylic Acid-Styrene-Butadiene Copolymer* | 223 | 140 |
| (3) Polyacrylic Acid | 45 | 20 |
| (4) Polyvinylidene Chloride | 94 | 25 |
| (5) Polyvinyl Chloride | 72 | 27 |
| (6) None | 81 | 38 |

*Invention

It has been confirmed that the surface sized paper with the styrene-butadiene copolymer and acrylic acid-styrene-butadiene copolymer in accordance with the present invention exhibited excellent adhesion between the polyolefin and the paper. It can also be seen that when the corona discharge treatment was followed after the surface sizing treatment with the styrene-butadiene copolymer and the acrylic acid-styrene-butadiene copolymer in accordance with the present invention, superior adhesion between the paper and the polyolefin was obtained.

Further, for the purpose of evaluating the water proof property, the supports were immersed in a developing processing solution for 5 minutes and in water for 1 minute, respectively. The surface sized papers with the styrene-butadiene copolymer and the acrylic acid-styrene-butadiene copolymer in accordance with the present invention showed good sizing property so that no permeation of the developing processing solution or water into the polyolefin coated paper was observed with the surface sized papers. The other supports had poor sizing property and therefore rapid drying could not be attained.

EXAMPLE 3

Onto the surface of a fine quality paper of a basis weight of 100 g/m² were coated (7) a styrene-butadiene copolymer (monomer weight ratio=50:50) latex, (8) an itaconic acid-styrene-butadiene copolymer (monomer weight ratio=2:50:48) latex, (9) an emulsion of a vinylidene chloride-vinyl chloride copolymer (monomer weight ratio=70:30) and (10) a polyacrylic acid ethyl ester emulsion, respectively, in a thickness of 0.2 g/m² on dry basis. The coated papers were heat dried at 60° C. for 40 seconds in dry air.

Polypropylene having a density of 0.851 to 0.935 g/cm³ was extrusion coated at 300° C. in a dry thickness of 30 microns onto the primer treated surface and the primer treated surface which had been subjected to a corona discharge, of the above-described papers to thereby obtain laminates.

The peeling strength of the thus obtained laminates was measured.

For comparison, the peeling strength of a non-primer treated paper was measured in a similar manner.

The results obtained are shown in Table 3 below.

TABLE 3

| | | Peeling Strength (g/25 mm) | |
|---|---|---|---|
| | Primer Treatment | Corona Discharge Treatment | No Corona Discharge Treatment |
| (7) | Styrene-Butadiene Copolymer | 150 | 96 |
| (8) | Itaconic Acid-Styrene-Butadiene Copolymer | 171 | 145 |
| (9) | Vinylidene Chloride-Vinyl Chloride Copolymer | 72 | 28 |
| (10) | Polyacrylic Acid Ethyl Ester | 43 | 16 |
| (11) | None | 58 | 10 |

From the results above, it can be clearly seen that the primer treatment in accordance with the present invention and the primer treatment and the corona discharge treatment in combination in accordance with the present invention provided excellent adhesion effect.

While the invention has been described in detail and with reference to specific embodiments thereof, it will be apparent to one skilled in the art that various changes and modifications can be made therein without departing from the spirit and scope thereof.

What is claimed is:

1. A polyolefin-paper laminate comprising (a) a base paper (b) a polymeric component consisting of a copolymer of (1) about 5 to about 95 weight percent of at least one diene monomer which is a conjugated or non-conjugated diene selected from the group consisting of an aliphatic unsaturated hydrocarbon represented by the formula (I):

$$C_nH_{2n-2} \qquad (I)$$

wherein n is an integer of 4 to 20 and (2) about 5 to about 95 weight percent of at least one styrene compound selected from the group consisting of styrene and styrene substituted by at least one of methyl, ethyl, isopropyl, butyl, hexyl, cyclohexyl, decyl, benzyl, chloro, chloromethyl ethoxymethyl, methoxy, bromo, carboxy or methoxy carbonyl incorporated into or coated on said base paper, and (c) an extrusion coated polyolefin layer thereon.

2. The laminate as claimed in claim 1, wherein said base paper (a) having incorporated therein or carried thereon said copolymer (b) is subjected to a corona discharge treatment.

3. The laminate as claimed in claim 1, wherein said conjugated diene is butadiene, isoprene or chloroprene.

4. The laminate as claimed in claim 1, wherein said styrene compound is styrene, α-methylstyrene or methylstyrene.

5. The laminate as claimed in claim 1, wherein said polyolefin layer (c) comprises a layer of a homopolymer of an α-olefin having 2 to 8 carbon atoms, a copolymer of said α-olefin, a copolymer of said α-olefin as a main component and one or more other monomers copolymerizable with said α-olefin, or a mixture thereof.

6. The laminate as claimed in claim 1, wherein said component (b) incorporated into or coated on said base paper consists of a copolymer latex.

7. The laminate of claim 1, wherein said copolymer is a styrene-butadiene copolymer.

8. A polyolefin-paper comprising (a) a base paper, (b) a polymeric component consisting of a copolymer of (1) about 5 to about 95 weight percent of at least one diene monomer which is a conjugated or non-conjugated diene selected from the group consisting of an aliphatic unsaturated hydrocarbon represented by the formula (I):

$$C_nH_{2n-2} \qquad (I)$$

wherein n is an integer of 4 to 20, (2) about 5 to about 95 weight percent of at least one styrene compound selected from the group consisting of styrene and styrene substituted by at least one of methyl, ethyl, isopropyl, butyl, hexyl, cyclohexyl, decyl, benzyl, chloro, chloromethyl ethoxymethyl, methoxy, bromo, carboxy or methoxy carbonyl, and (3) about 0.1 to about 20 weight percent of a monomer copolymerizable therewith and represented by the formula (III)

$$R_1-CH=C-R_2 \atop | \atop COOH \qquad (III)$$

wherein $R_1$ and $R_2$, which may be the same or different, each is a hydrogen atom, an alkyl group, or an aryl group and (c) an extrusion coated polyolefin layer thereon.

9. The laminate as claimed in claim 8, wherein said monomer (3) having a carboxyl group in the molecule thereof is acrylic acid, methacrylic acid, itaconic acid or maleic acid.

10. The laminate as claimed in claim 8, wherein said base paper (a) having incorporated therein or carried thereon said copolymer (b) is subjected to a corona discharge treatment.

11. The laminate as claimed in claim 8, wherein said polyolefin layer (c) comprises a layer of a homopolymer of an alpha-olefin having 2 to 8 carbon atoms, a copolymer of said alpha-olefin, a copolymer of said alpha-olefin as a main component and one or more other monomers copolymerizable with said alpha-olefin, or a mixture thereof.

12. The laminate as claimed in claim 8, wherein said component (b) incorporated into or coated on said base paper consists of a copolymer latex.

13. The laminate of claim 8, wherein said copolymer is an acrylic acid-styrene-butadiene copolymer.

* * * * *